G. S. WASHBURN.
TRAILER VEHICLE.
APPLICATION FILED NOV. 15, 1917.
1,293,269.
Patented Feb. 4, 1919.
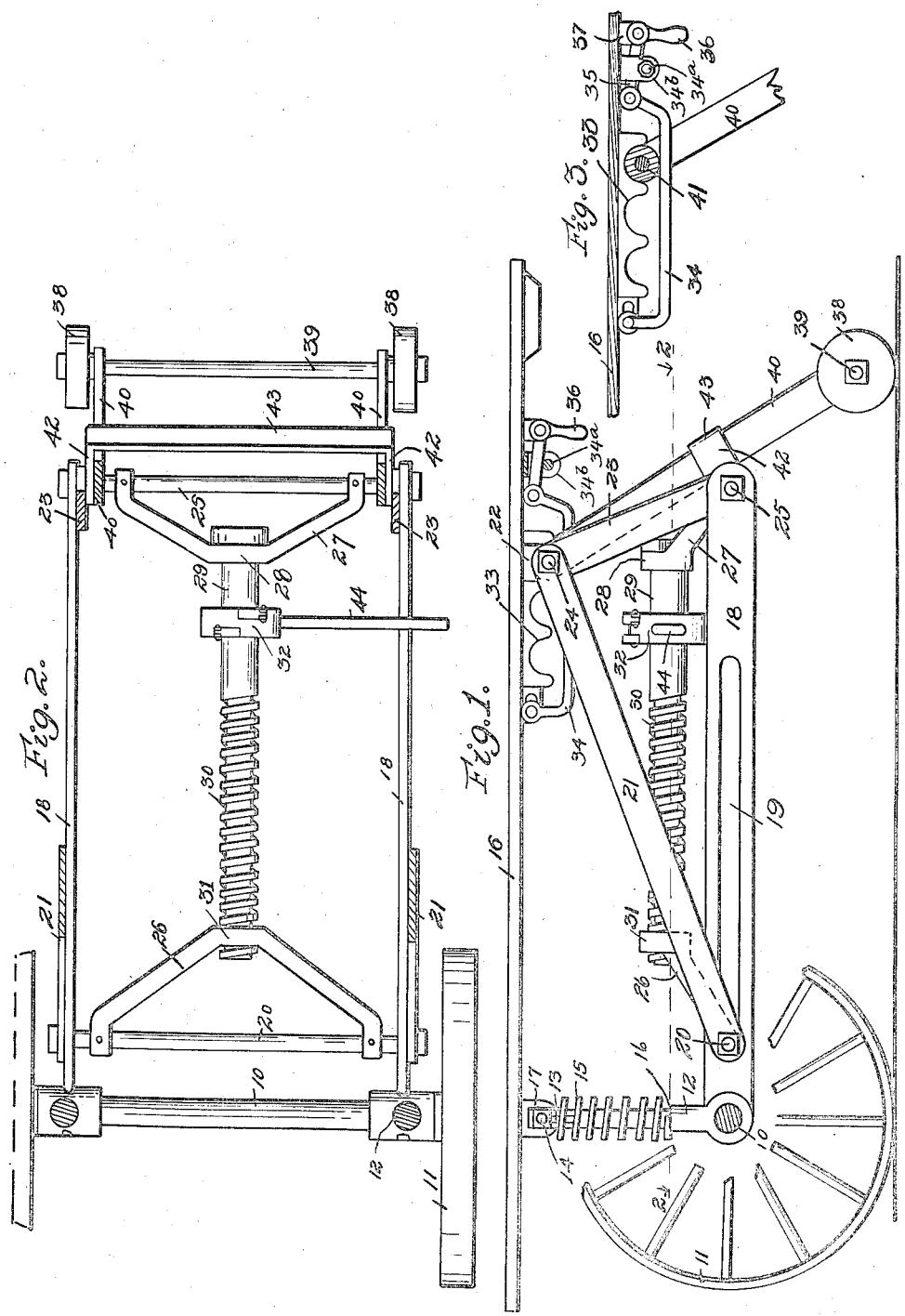
Inventor
George S. Washburn
Witness
Will Freeman

UNITED STATES PATENT OFFICE.

GEORGE SHELDON WASHBURN, OF BLAIRSTOWN, IOWA.

TRAILER-VEHICLE.

1,293,269.             Specification of Letters Patent.         Patented Feb. 4, 1919.

Application filed November 15, 1917. Serial No. 202,234.

*To all whom it may concern:*

Be it known that I, GEORGE SHELDON WASHBURN, a citizen of the United States, and resident of Blairstown, in the county of Benton and State of Iowa, have invented a certain new and useful Trailer-Vehicle, of which the following is a specification.

The object of my invention is to provide a trailer vehicle of simple, durable and inexpensive construction adapted to carry a load and having its forward end mounted on a truck or the like.

Still a further object is to provide such a device having a pair of rear wheels and having means for slightly elevating its forward end and for supporting the forward end when the truck is moved away.

Still a further object is to provide such a device having a platform capable of being tilted for discharging a load from its lower end.

Still a further object is to provide such a device having means for supporting its forward end, said wheels being capable of being moved out of the way when the device is attached to a truck.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of the device embodying my invention, one rear wheel being removed and the rear axle being shown in section.

Fig. 2 shows a horizontal, sectional view taken on the line 2—2 of Fig. 1, and

Fig. 3 shows a vertical, sectional view through the lower part of the load platform, illustrating part of the mechanism for supporting the forward end of said platform.

In the accompanying drawings, I have used the reference numeral 10 to indicate generally the rear axle of my improved trailer on which are mounted the rear wheels 11.

Tiltably mounted on the rear axle are upwardly extending standards 12 having in their upper ends vertically elongated slots 13. A transverse shaft 14 is mounted in the slots 13 and is yieldingly held at the upper limit of its movement by means of springs 15, the lower ends of which engage shoulders 16 on the upright standards 12.

A load platform 16 has downwardly extending brackets 17 forming bearings for the shaft 14.

The lower ends of the upright standards 12 are forked and between the arms of each fork, a bar 18 is pivoted to the axle 10 and extends forwardly therefrom. Each bar 18 is provided with a longitudinally, elongated slot 19.

Extended through the slots 19 is a transverse shaft 20.

Pivoted to the shaft 20 near its opposite ends and extending upwardly and forwardly in the machine are arms 21 which at their forward ends are pivoted to brackets 22 on the under surface of the load platform.

Braces 23 extend from the forward ends of the arms 18 upwardly to the brackets 22. The upper ends of the arms 21 and braces 23 are pivoted to the brackets 22 by means of bolts 24.

A transverse shaft 25 connects the forward ends of the arms 18 and the lower ends of the braces 23.

Carried by the shafts 20 and 25 are brackets 26 and 27.

The bracket 27 has a bearing in which is rotatably but non-slidably mounted one end of a strong rod 29. The other end of the rod 29 is screw-threaded at 30 for a considerable distance, and said screw-threaded end is mounted in a screw-threaded bearing 31 on the bracket 26.

On the rod 29 is a double pawl and ratchet device 32, whereby said rod may be rotated in either direction.

Mounted on the lower surface of the load platform 16 is a notched block or the like 33.

Pivoted at the rear of the block 33 is one end of an upwardly opening yoke 34, which is also capable of limited sliding movement.

Pivoted to the lower surface of the load platform 16 is a bell crank lever 35 having at one end a handle 36, and having the other end pivoted to the forward end of the yoke 34.

The pivot point of the bell crank 35 is on a bracket 37 and is spaced somewhat below the load platform.

At the forward part of the device is a pair of spaced small wheels 38 mounted on a transverse shaft 39.

Extending upwardly and rearwardly from the shaft 39 are arms 40 which are connected at their upper ends by a transverse shaft 41.

Pivotally mounted on the shaft 25 are the arms 42 of a yoke 43. The arms 40 are received between the yoke 43 and the shaft 25 and it will be noted that they are slidably and pivotally supported with relation to the shaft 25. The shaft 41 is received within the yokes 34 and in one of the notches of the block 33.

In the practical use of my improved trailer, the forward end of the load platform is secured in any suitable way to a truck.

The handle 36 may be grasped and swung forwardly for lowering the yoke 34, whereupon the upper ends of the arms 40 may be swung rearwardly for raising the wheels 38 off the ground. The load may then be imposed upon the platform 16 and the trailer may be drawn behind the truck.

If it is desired to keep the load on the trailer, but separate the trailer from the truck, the yoke 34 is lowered and the shaft 41 is moved to one of the forward notches whereupon the yoke 34 is again raised and the operator moves the handle 44 for operating the ratchet for rotating the rod 29 and thereby drawing the shaft 20 forwardly in the machine.

The yoke 34 may be held in raised position by a bolt 34ª extended through the arms of a U-bolt 34ᵇ.

This has the effect of swinging the forward part of the load platform upwardly and forwardly for moving the arms 40 toward vertical position.

It will be of course understood that the load platform moves forwardly with relation to the axle 10. As soon as the forward end of the load platform is free of the truck, the truck may be pulled away and the arms 40 and wheels 38 will support the front end of the load of the trailer.

If it is desired to discharge the load at the back end of the trailer, the operation of rotating the rod is continued, for thereby swinging the forward end of the load platform upwardly and the rear end forwardly and downwardly until sufficient incline has been given to the load platform 16 to discharge the load.

The ratchet may then be operated in the opposite direction for restoring the platform 16 to horizontal position.

Some changes may be made in the construction and arrangement of the parts of my improved trailer without departing from the essential features and purposes of my invention, and it is my intention to cover by my claims any modified forms of structure or use of mechanical equivalents which may be included within the scope of my claims.

I claim as my invention:

1. In a device of the class described, an axle, wheels thereon, upright members on said axle, a load platform secured to the uper ends of said upright members, a bar pivoted on said axle and extending forwardly, a brace pivoted to said bar and extending upwardly and pivoted to said load platform, an arm pivotally and slidably mounted on said bar at one end, and having its other end pivotally connected with said load platform, an arm pivotally mounted on said load platform and extending downwardly and having a supporting device at its lower end, said arm being also pivoted between its ends, and means for forcing the slidable end of said first arm away from said axle for supporting the forward end of said platform.

2. In a device of the class described, an axle, wheels thereon, upright members on said axle, a load platform secured to the upper ends of said upright members, a bar pivoted on said axle and extending forwardly, a brace pivoted to said bar and extending upwardly and pivoted to said load platform, an arm pivotally and slidably mounted on said bar at one end, and having its other end pivotally connected with said load platform, an arm pivotally mounted on said load platform and extending downwardly and having a supporting device at its lower end, said arm being also pivoted between its ends, means for forcing the slidable end of said first arm away from said axle for supporting the forward end of said platform, said last named arm being slidably mounted at the pivot point between its ends, and being capable of adjustment at its upper end longitudinally of said load platform.

3. In a device of the class described, an axle, a pair of wheels thereon, upright members on said axle, a load platform supported on said upright members, bars extending forwardly from said axle, braces pivoted to the forward ends of said bars and extending upwardly and pivoted to said load platform, arms pivotally and slidably mounted on said bars, and extending upwardly and forwardly in the device, having their forward ends pivoted to said load platform, a transverse shaft, wheels thereon, arms extending upwardly from said shaft and pivotally supported on said load platform, means for pivotally mounting said last described arms between their ends, and means for sliding the rear ends of said first arms forwardly on said bars.

4. In a device of the class described, an axle, a pair of wheels thereon, upright members on said axle, a load platform supported on said upright members, bars extending forwardly from said axle, braces pivoted to the forward ends of said bars and extending upwardly and pivoted to said load platform, arms pivotally and slidably mounted on said bars, and extending upwardly and forwardly in the device, having their forward ends pivoted to said load platform, a transverse shaft, wheels thereon, arms extending upwardly from said shaft and pivotally supported on said load platform, means for pivotally mounting said last described arms between their ends, means for sliding the rear ends of said first arms forwardly on said bars, said second described arms being slidably mounted as well as pivotally mounted between their ends, and being capable of adjustment longitudinally at their upper ends on said load platform.

5. In a device of the class described, an axle, a pair of wheels thereon, upright members on said axle, a load platform supported on said upright members, bars extending forwardly from said axle, braces pivoted to the forward ends of said bars and extending upwardly and pivoted to said load platform, arms pivotally and slidably mounted on said bars, and extending upwardly and forwardly in the device, having their forward ends pivoted to said load platform, a transverse shaft, wheels thereon, arms extending upwardly from said shaft and pivotally supported on said load platform, means for pivotally mounting said last described arms between their ends, means for sliding the rear ends of said first arms forwardly on said bars, said last described means including a screw-threaded rod.

6. In a device of the class described, an axle, a pair of wheels thereon, upright members on said axle, a load platform supported on said upright members, bars extending forwardly from said axle, braces pivoted to the forward ends of said bars and extending upwardly and pivoted to said load platform, arms pivotally and slidably mounted on said bars, and extending upwardly and forwardly in the device, having their forward ends pivoted to said load platform, a transverse shaft, wheels thereon, arms extending upwardly from said shaft and pivotally supported on said load platform, means for pivotally mounting said last described arms between their ends, means for sliding the rear ends of said first arms forwardly on said bars, said second described arms being slidably mounted as well as pivotally mounted between their ends, means for adjustably mounting the upper ends of said second described arms on said load platform, said means comprising a transverse shaft, a toothed bar, and an adjustable yoke.

Des Moines, Iowa, October 27, 1917.

GEORGE SHELDON WASHBURN.